United States Patent [19]

Seipos

[11] 4,224,714
[45] Sep. 30, 1980

[54] CASTER ASSEMBLY

[75] Inventor: Andrew G. Seipos, Miami, Fla.

[73] Assignee: Automated Building Components, Inc., Miami, Fla.

[21] Appl. No.: 39,970

[22] Filed: May 17, 1979

[51] Int. Cl.$^2$ ............................................. B60B 33/00
[52] U.S. Cl. ............................................. 16/29; 16/21
[58] Field of Search ............... 16/2, 20, 21, 29, 30, 16/39, 42 T, 43, 18

[56] References Cited

U.S. PATENT DOCUMENTS

| 342,930 | 6/1886 | Raymond | 16/38 |
|---|---|---|---|
| 1,232,688 | 7/1917 | Johnson | 16/38 |
| 2,986,746 | 6/1961 | Jackson | 16/21 |
| 3,166,780 | 1/1965 | Schultz | 16/21 |

Primary Examiner—Doris L. Troutman
Attorney, Agent, or Firm—LeBlanc, Nolan, Shur & Nies

[57] ABSTRACT

An assembly including a mechanism for retaining a rotatable member, such as a caster, mounted on an elongated member, on a support. The support, such as, for example, the bottom of a sofa, has a bore hole for receiving the elongated member. A planar metal plate having a central opening is secured to the support so that its opening is aligned with the bore hole. A plurality of teeth are struck from the metal plate so as to project outwardly from a side face of the plate. The struck teeth leave a plurality of corresponding slots in the plate. The plate is secured to the support bearing the bore hole. A resilient member having a central opening is positioned between the plate and the support so as to be in alignment with the opening in the plate and the bore hole. When attaching the elongated member, on which the roller is mounted, to the support, the elongated member will pass through the opening in the plate and the resilient member into the bore hole. The dimensions of the opening in the plate and the inner dimensions of the resilient member are such as to firmly grip the elongated member when it is attached to the support.

16 Claims, 10 Drawing Figures

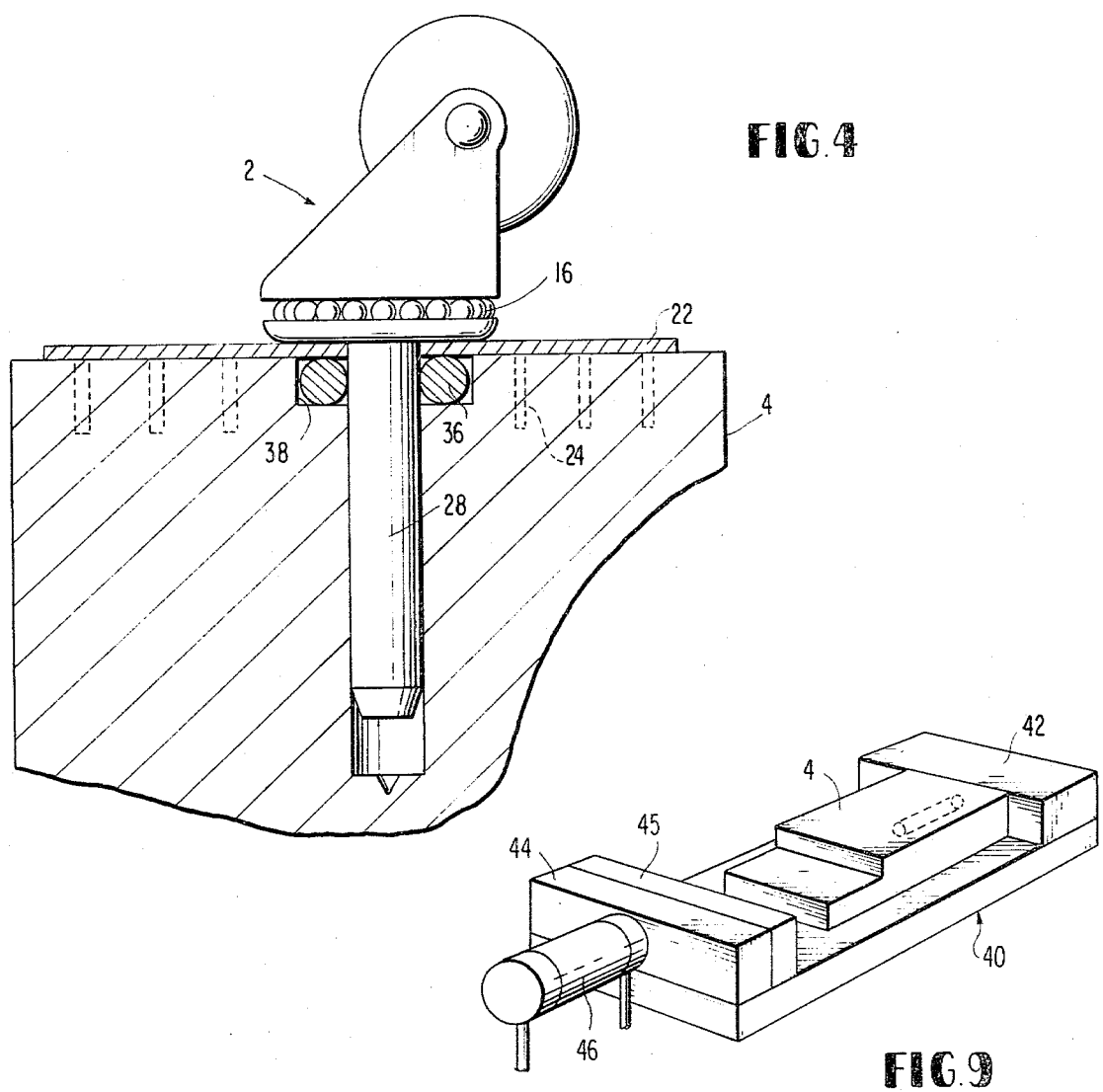
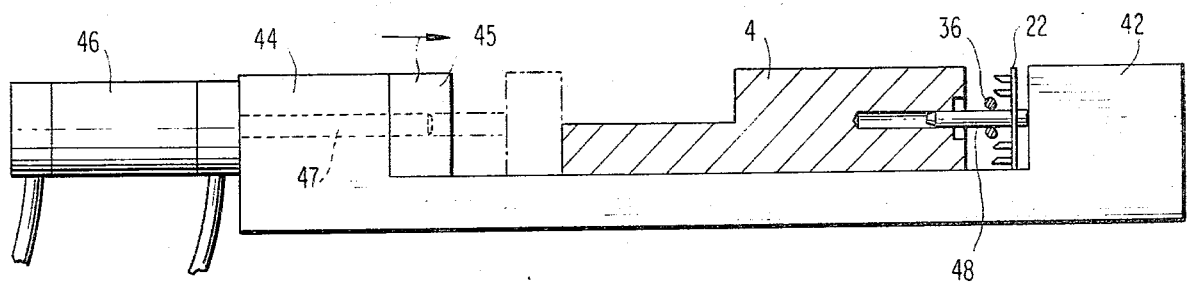

CASTER ASSEMBLY

BACKGROUND OF THE INVENTION

The present invention relates to an assembly for retaining a caster mounted on a shaft on a support structure, e.g. the leg of a sofa.

In accordance with the prior art, casters have typically been connected to the legs of various pieces of furniture by the use of a mounting member having a serrated edge. Such an arrangement is shown in FIG. 1 of the drawing. As illustrated, a caster 2 is to be secured to a leg 4, such as the leg of a sofa or a stretcher for a sofa. Actually, the caster is secured within opening 8 in end face 6 of the leg. Caster 2 includes a roller 18, a support 20 for rotatably supporting the roller, and ball bearings 16 which rotate in a disk-like member 17 and enable support 20 to be rotatable about the longitudinal axis of a mounting shaft 11. Shaft 11 has a knob-like locking member 13 at its lower end. The caster is secured to mounting sleeve 10 that has two sleeve elements and a serrated retainer 12. The two-part sleeve 10 can be easily inserted into the bore hole but once shaft 11 is inserted, the two parts are spread apart thereby providing a force against the removal of the caster assembly.

In utilizing the above-described caster assembly, first sleeve member 10 is inserted into hole 8 and retainer 12 is seated with a mallet. Then shaft 11 of caster 2 is inserted into sleeve member 10 and also tapped with a mallet to permanently lock to the sleeve. When shaft 11 is locked in sleeve member 10 the two parts of the sleeve member are spread apart and knob 13 extends below and is secured by the bottom of sleeve member 10.

During use of the furniture, the motion of the furniture across the floor applies a lateral force to the roller. This force is especially significant when the furniture is pushed over rough surfaces such as concrete surfaces at the manufacturing facility, the storage location and sidewalks during delivery. Like forces are also created during abrupt movements of the furniture or when the furniture is pushed over objects on the floor. Such forces can occur even once the furniture is in the home or office where it is to be used. Similarly, when the furniture is pushed over thick carpeting, it incurs significant resistance to the movement and hence increased lateral forces on the caster assembly are created. All of these various types of forces create in effect a shock load on the caster assembly.

The lateral forces that are created are transmitted to shaft 11 and sleeve 10 that is positioned in hole 8, which applies pressure to the wooden support. If the force is large enough, shaft 11 and sleeve 10 can cause a splitting or cracking of the leg. Even if the force is not that abrupt or significant, the creation of the lateral force that is transmitted to shaft 11 and sleeve 10 over a period of time will cause the sleeve to enlarge the inner dimensions of hole 8 thereby causing the sleeve and hence the caster assembly to become loose from support 4. Retainer 14 provides little resistance to such lateral force and in fact serrated edges 15 can cause further splitting or cracking of the support. Consequently, such lateral forces that occur on the caster assembly during movement of the furniture eventually cause the casters to become loose and can also eventually damage the furniture itself.

While there are reinforcing plates per se disclosed within the prior art for preventing splitting of wood, there is no known assembly that avoids the above discussed problems. Such reinforcing plates are illustrated in U.S. Pat. Nos. 3,419,205 to J. C. Jureit and 3,480,305 to W. E. Jureit.

SUMMARY OF THE INVENTION

An object of the present invention is to provide a caster assembly that avoids the problems discussed above.

Another object of the present invention is to provide an assembly capable of retaining a shaft on which a caster is mounted that avoids the problems inherent with utilizing previously known retaining assemblies.

A further object of the present invention is to provide a caster assembly in which the shaft supporting the caster is retained within a support member in such a manner as to avoid any damage to the support member caused by lateral forces created during movement of the caster over a surface.

Still another object of the present invention is to provide an assembly for retaining a shaft supporting a caster in which the forces created by lateral movement of the caster are not transmitted by the shaft directly to the support member thereby avoiding damage to the support member due to movement of the caster over a surface.

Still a further object of the present invention is to provide a caster assembly in which a caster is mounted on a shaft secured to a support member and lateral forces created by movement of the caster are transmitted to a plate surrounding the opening on the support member in which the shaft is secured so that such lateral forces are transmitted to the plate and not directly to the hole within the support member.

The above noted objectives are achieved in accordance with the present invention. For this purpose, the present invention provides a retaining system for attaching to a support, such as the leg of a sofa, a rotatable member mounted on an elongated member. The support has a bore hole for receiving the elongated member. A metal plate having an opening and a plurality of slender elongated nail-like teeth struck therefrom to project outwardly from a side face of the plate is positioned on the side of the support bearing the bore hole. The opening in the plate is aligned with the bore hole. The plate can be secured to the support by embedding the teeth of the plate in the support. A resilient member that is preferably a resilient ring is positioned between the plate and the support member with its opening aligned with the opening in the plate and the bore hole in the support member. Once the plate and resilient ring have been secured to the support, the elongated member is forced through the openings in the plate and the resilient ring into the bore hole. The dimensions of the opening in the plate, the inner dimensions of the resilient ring and the dimensions of the bore hole are all properly selected so as to snugly secure the elongated member thereby in effect securing the rotatable member to the support.

When attaching a rotatable member, such as a caster, in the manner described above, a secure and solid support is provided that also effectively eliminates the possibility of splitting or cracking in the wooden support due to lateral forces created during movement of the caster over the floor. By dimensioning the opening in the metal plate so as to be approximately equal to the cross sectional dimensions of the elongated member, this insures that the elongated member snugly fits within the metal plate. Thus, any lateral forces that are created during movement of the caster will be transmitted to the plate and not directly to the wooden support through the elongated member. Since the plate itself is secured to the support by the teeth, the lateral forces are spread out over a fairly substantial area thereby minimizing the effect of such forces and avoiding the possibility of damage to the support.

In accordance with the preferred embodiment of the present invention, the elongated member, the opening in the plate and the resilient member all have a circular cross section. In addition, the diameter of the resilient member preferably should be less than the diameter of the elongated member so as to insure a snug fit between the two members. The resilient member is positioned within a counter-bore surrounding the bore hole in the support member and is held in place by the plate which is positioned over the counter-bore. Thus, the snug fit between the resilient member and the elongated member serves to securely fasten the elongated member within the bore hole.

In further accord with the preferred embodiment of the present invention, the teeth that are struck from the plate are substantially constant in width throughout a substantial portion of their length. The length to width ratio of the teeth should preferably be four to one so as to insure that the teeth are securely fastened within the support. The teeth are struck from the plate so as to form a plurality of spaced longitudinal rows having no fewer than two teeth per row. The teeth in each row are struck in an opposite direction from the teeth in the next adjacent rows so that the slots left in the plate extend from their respective teeth in a direction opposite to the direction that the slots in the next adjacent row extend from their respective teeth. While the drawings in the present application only show one tooth being struck from each slot, two or more teeth can be struck from each slot in accordance with the present invention.

Both the width and length of the plate preferably should be between 5 and 15 times greater than the diameter of the shaft on which the caster is mounted. This relationship provides for a better distribution of the lateral forces that are created.

In order to secure the planar teeth and the retaining ring in their proper position on the end face of the support, it is possible to first place the ring within the counter-bore and then to press the plate onto the surface of the support. Alternatively, this operation can be simultaneously executed by mounting both the plate and the ring on a spindle attached to one platen with the teeth facing away from the platen and then pushing the support toward the spindle. The spindle is properly positioned so as to fit within the bore hole and is properly dimensioned so as to be freely removable from the bore hole. In this manner, in a single operation, the retaining ring and the plate can be secured to the end face of the support. After the plate and ring have been so secured, the shaft on which the caster is mounted is forced through the opening in the plate and the retaining ring and into the bore hole.

Hence, the caster assembly in accordance with the present invention provides much greater resistance to the lateral forces created during movement of the caster. Such resistance to lateral forces prevents splitting or cracking of the support and also any widening of the bore hole which would enable the shaft on which the caster is mounted to come free.

BRIEF DESCRIPTION OF THE DRAWINGS

FIG. 4 is a side, elevational, partially sectional view of a caster assembly in accordance with the present invention.

FIG. 9 is a perspective view of a machine for automatically securing the metal plate and resilient ring on a support member in accordance with the present invention.

FIG. 10 is a side, elevational, partially sectional view of the machine illustrated in FIG. 5.

DESCRIPTION OF THE PREFERRED EMBODIMENTS

Figure 1:
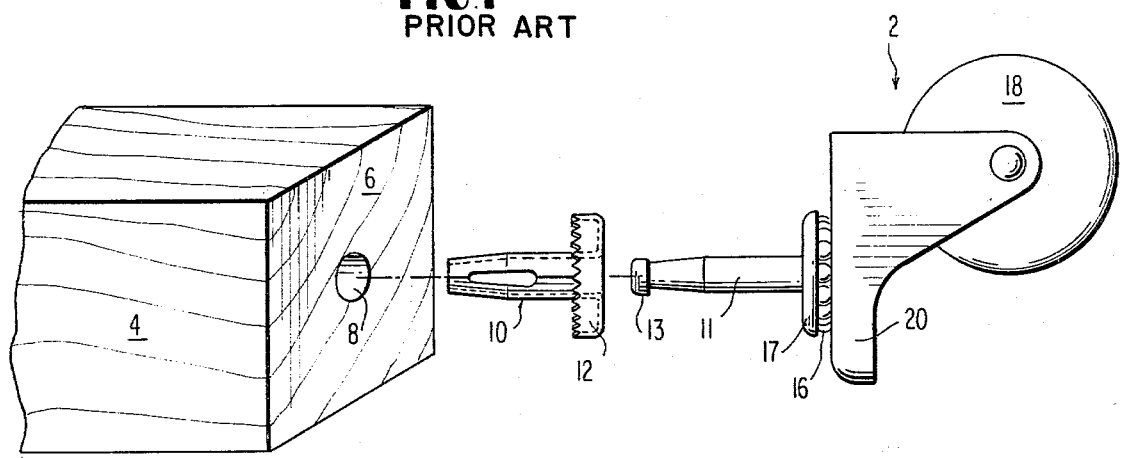
FIG. 1 is a perspective view of a caster assembly constructed in accordance with the prior art.

As previously discussed, a caster assembly constructed in accordance with the prior art is illustrated in FIG. 1. In that illustration, a caster 2 is attached to a shaft 11 which is then secured within a mounting sleeve 10 inserted in a bore hole 8 in support 4. In describing the embodiments of the present invention, like referenced numerals will be utilized where the various elements are the same including where they are the same as in the prior art.

Figure 2:
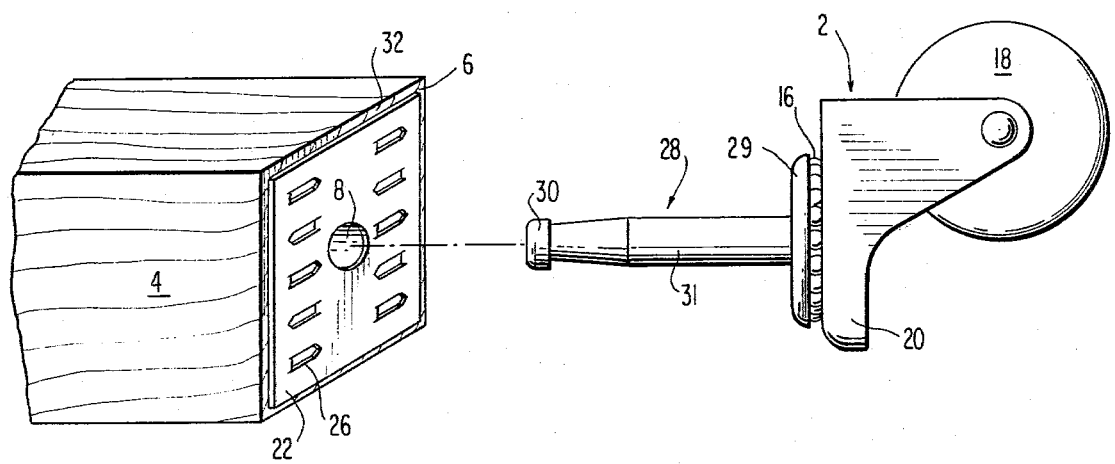
FIG. 2 is a perspective view of a caster assembly constructed in accordance with the present invention.

In the caster assembly in accordance with the present invention as illustrated in FIG. 2, caster assembly 2 is to be secured within a bore hole 8 in a support 4. The caster itself includes a roller 18 mounted on a bracket 20, which is secured to a mounting member 28. Ball bearings 16 are deposed between bracket 20 and a disk-like member 29 located at the top of mounting member 28.

Figure 3:
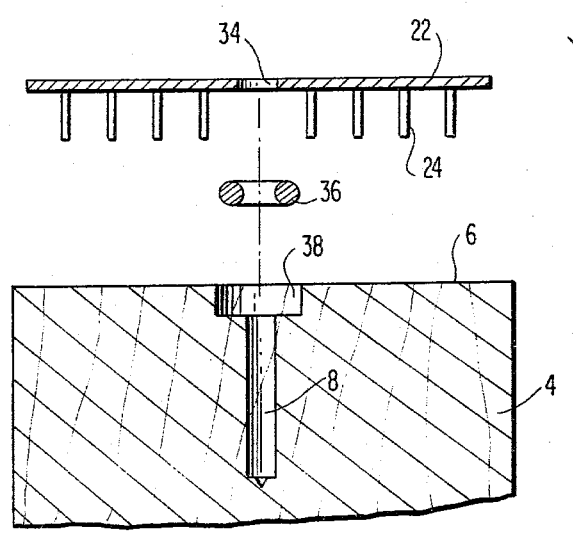
FIG. 3 is a side, elevational, sectional, exploded view of a support member, a resilient ring and a plate in accordance with the present invention.

As can be seen from FIGS. 2 and 3, a planar metal plate 22 has a plurality of nail-like teeth 24 struck therefrom leaving a plurality of corresponding slots 26. The teeth are struck so as to leave narrow elongated slots that are arranged in a spaced side-by-side relationship in a plurality of longitudinally extending rows. The teeth are struck so that slots 26 in adjacent longitudinal rows extend from the teeth in opposite longitudinal directions. Although not illustrated, the slots in each longitudinally extending row can be staggered relative to the next adjacent longitudinally extending row. While only five rows of teeth are illustrated, with two teeth being struck in each row, it should be understood that a larger plate having more rows and more teeth per row could be provided depending on the size of the end face 6 of support member 4 to which the plate is to be secured. The dimensions of plate 22, however, should always be slightly less than the outer dimensions of end face 6 so that once the plate is secured a marginal area 32 is provided around the periphery of the plate. It is considered highly desirable to leave this small spacing 32 around the plate so that the teeth struck from the plate are always spaced from the edge of end face 6 of support 4. If the teeth are too close to the edge of support 4 then it is possible for the support to split or crack when the teeth near the edge are driven into the support.

In the center of plate 22 is a circular opening 34. Opening 34 is intended to be placed in alignment with bore hole 8 in support 4 so that shaft 31 of mounting member 28 can pass through opening 34 into bore hole 8. The diameter of opening 34 should at most be equal to the diameter of the cross sectional bore hole 8. It is possible for the diameter of opening 34 to be slightly less than the diameter of bore hole 8. Reference is being made herein to the diameter of the various members since in accordance with the preferred embodiment both opening 34 and the cross section of bore hole 8 would be circular so as to receive a shaft 31 that is substantially cylindrical in shape.

Positioned between plate 22 and support 4 is a resilient O-ring 36. Ring 36 can be made of any suitably resilient synthetic rubber material. Ring 36 is arranged in a counter-bore 38 formed in end face 6 of support 4. Ring 36 and counter-bore 38 are also aligned with the center axis of opening 34 and bore hole 8. In accordance with the preferred embodiment, counter-bore 38 is slightly oversized so as to freely and easily receive ring 36. On the other hand, the inner diameter of ring 36 should be slightly less than the diameter of opening 34 and the largest cross sectional diameter of shaft 31. By providing ring 36 with a diameter slightly less than the diameter of shaft 31, this insures that there is a tight fit between ring 36 and shaft 31. Since ring 36 is secured within counter-bore 38 once plate 22 is attached to support 4, this in effect serves to securely fasten shaft 31 along with the attached caster to the support.

Merely by way of example, if the largest diameter of shaft 31 of mounting member 28 is 5/16" in diameter, then the diameter of bore hole 8 and also of opening 34 should be minutely larger than 5/16". Ring 36, on the other hand, could have an inner diameter of ¼" and an outer diameter of ½" and have a cross sectional diameter of ⅛".

Turning now to the other elements of the caster assembly, additional representative dimensions will be provided below. If end face 6 of support 4 is square with four inches on each side, then plate 22 would also probably be square with a dimension of approximately 3½". As previously mentioned, the dimensions of plate 22 should be slightly less than the dimensions of end face 6 so as to leave a space between the end of the plate and the edge of support 4. This spacing should be approximately ⅛" to ¼" all the way around the peripheral edge of the plate. The provision of such a clearance serves two purposes, first and foremost, the teeth struck from plate 22 should not be too close to the edge of the support. If the teeth are too close to the edge of the support then the teeth could break through the edges of the support when the plate is attached to the support. A second reason for maintaining the clearance around the edge of the plate is to insure that the plate is not visible once the support is placed face down on the floor.

The gauge of metal plate 22 will vary depending on the intended use for the caster assembly. Where either a larger support is utilized or where the caster assembly will be subjected to extremely strenuous forces, then a thicker metal plate should be employed. Typically, however, the gauge of the plate can be anywhere from 14 to 20 U.S. standard gauge.

The length and width of the teeth, in this example, are approximately ⅜", and ⅛", respectively. While teeth 24 that are struck from plate 22 as illustrated in the drawings form an angle of 90° with the plate, the actual angle can be slightly greater than 90°. By bending the teeth so as to form an angle of greater than 90°, corresponding teeth in adjacent rows will diverge from one another at very slight angle. While the teeth are nail-like in form and offer a high resistance against withdrawal, striking the teeth so that they have angles of slightly greater than 90° provides for a substantial increase in the withdrawal resistance of the plate from the support. In addition, the teeth can be slightly arcuate in cross section which also increases the resistance against withdrawal. Finally, as can be seen from the slots in FIG. 2, the teeth that are struck from the plate have a V-shape formation which enables them to be readily and easily embedded in the support.

Figure 5:
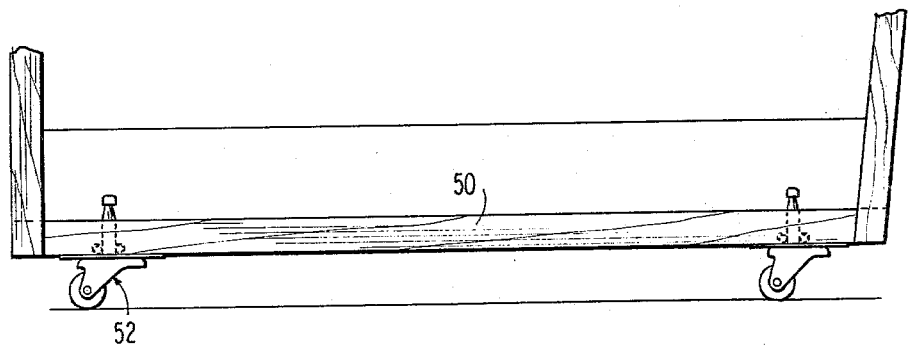
FIG. 5 is a side elevational view of a stretcher having two caster assemblies according to the present invention mounted thereon.
Figure 6:
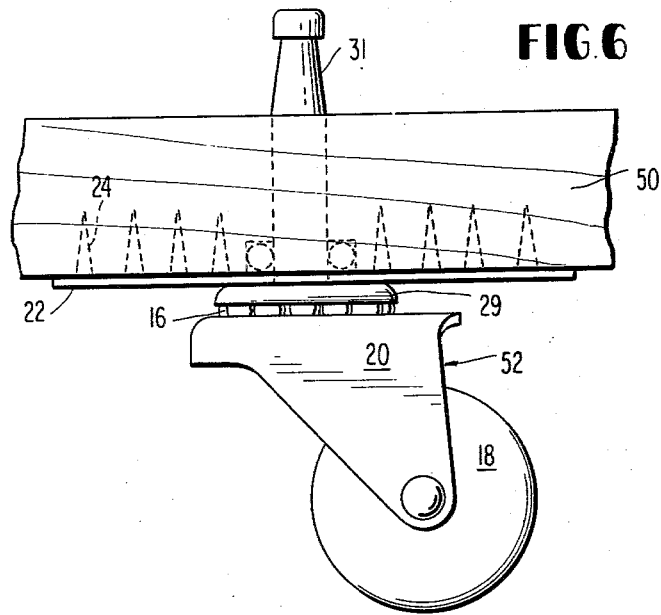
FIG. 6 is an enlarged view of the caster assembly on the stretcher in FIG. 5.
Figure 7:
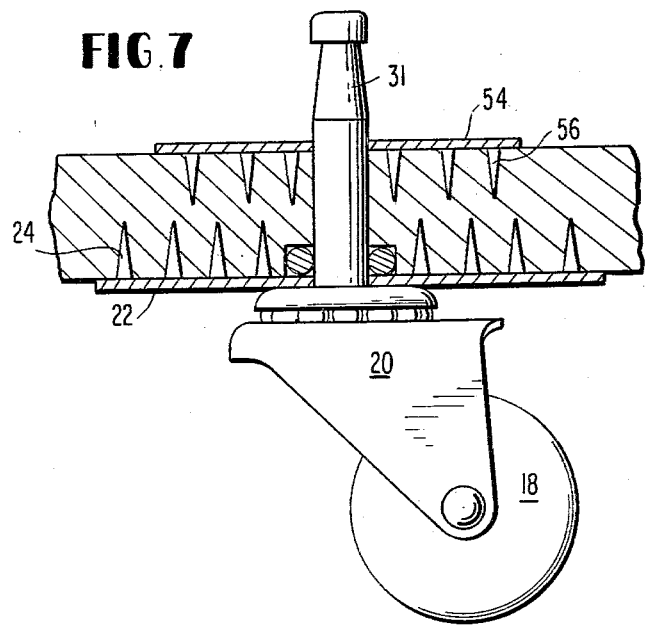
FIG. 7 is another embodiment of a caster assembly for a stretcher in accordance with the present invention.

The caster retaining assembly of the present invention can be mounted on any wooden support forming the bottom of a sofa or chair. For example, the caster assembly 52 can be mounted on a sofa stretcher 50 as shown in FIGS. 5 and 6. Caster assembly 52 is essentially the same as the caster assembly previously described above and the same reference numerals apply to the same elements. As shown in FIG. 6, however, shaft 31 of caster assembly 52 extends through stretcher 52 since the shaft is longer than the width of the stretcher. If stretcher 52 is too thin, then a second split preventing plate 54 with teeth 56 can be secured to the top of stretcher 50, as shown in FIG. 7. Plate 54 is similar to plate 22. In the embodiment of FIG. 7 where two plates are used, shaft 31 extends through openings in both plates. This use of two plates not only reinforces the wood and improves its split resistance, but also gives the shaft of the caster assembly a much more reliable pressure bearing surface.

Figure 8:
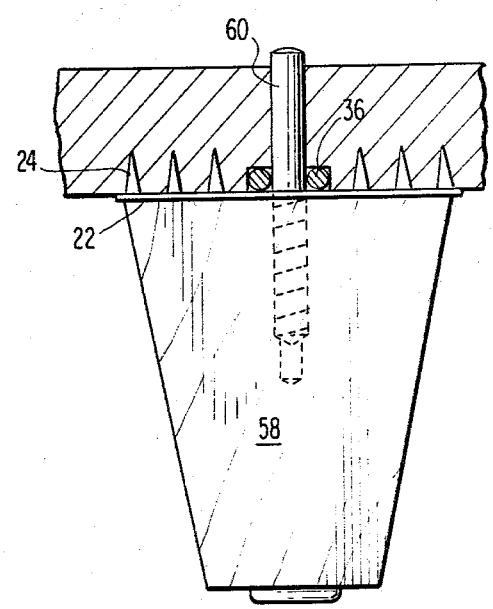
FIG. 8 is a side elevational view of a leg other than a caster held by a retainer according to the present invention.

Although the retaining assembly of the present invention is primarily intended to be used for securing a caster assembly, it can be used in the retention of a wood or plastic leg 58, such as shown in FIG. 8. In such an arrangement, the leg would have a metal pin 60 that would pass through plate 22 and be secured by ring 36. This would enable the shipment of legs or casters on an interchangeable basis.

In FIGS. 9 and 10, one embodiment of a machine that can be utilized for securing plate 22 and ring 36 to support 4 is illustrated. In accordance with that illustrated embodiment, plate 22 is first placed on a spindle 48 that is secured in a platen 42. The plate is arranged on the spindle so that teeth 24 face away from the platen 42. Next, ring 36 is placed on spindle 48. Then support 4 is positioned in the open space adjacent to spindle 48 with bore hole 8 being aligned with spindle 48. Support 4 is then pushed towards plate 22 and platen 42 by a movable platen 45.

Platen 45 is secured on the end of a piston rod 47 that is extendable by a hydraulic mechanism 46. Piston rod 47 passes through stationary block 44 and is secured at its end to platen 45. After support 4 has been positioned in the open space, hydraulic mechanism 46 is actuated, rod 47 is extended and platen 45 pushes support 4 onto spindle 48 and towards and into engagement with plate 22.

By employing a caster assembly such as described and claimed herein, a secure and solid support is provided that also effectively avoids the possibility of the support splitting or cracking due to lateral forces created during movement of the caster over the floor. The lateral forces that are generated during movement of the caster are transmitted to the plate and not directly to the support. Since the metal plate is rigidly secured to the support, the lateral forces are spread out over a fairly substantial area thereby minimizing the effect of these forces.

In conducting comparative tests between a caster assembly in accordance with the present invention and a caster assembly in accordance with the prior art, such as illustrated in FIG. 1, it was found that the assembly of the present invention when using a support made of southern yellow pine had a static load capability of almost 600 pounds. In comparison, the caster assembly illustrated in FIG. 1 had an ultimate load capability of approximately 270 pounds.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and the range of equivalency of the claims therefore are intended to be embraced therein.

I claim:

1. A retaining system for attaching to a support member a leg member mounted on an elongated member, the support member having a bore hole therein for receiving the elongated member, said system comprising: a planar metal plate having an opening and a first plurality of slender elongated nail-like teeth struck therefrom to project outwardly from a side face of said plate and leaving a second plurality of corresponding slots in said plate such that at least one of said teeth extends from each of said slots, said plate being capable of being secured to the support member with said teeth thereof being embedded in one side of such support member and with said opening of said plate being aligned with the bore hole in the support member; and a resilient member having a central opening therein with inner dimensions less than the smallest dimension of said opening in said plate, said resilient member being adapted to be positioned between said plate and the support member with the central axis of said resilient member being in alignment with the central axes of said opening in said plate and the bore hole, whereby when the elongated member is attached to the support member, the elongated member passes through said openings in said plate and said resilient member and is gripped by both the edges of said plate surrounding said opening in said plate and the edges of said resilient member surrounding said central opening.

2. A system according to claim 1 wherein said resilient member is in the form of a ring and said opening in said plate is circular so as to securely receive a generally cylindrical elongated member that is arranged within a cylindrical bore hole in the support member.

3. A system according to claim 2 wherein the diameter of said opening in said plate and the inner diameter of said resilient member are at most approximately equal to the diameter of the elongated member to be attached to the support member.

4. A system according to claim 3 wherein said teeth that are struck from said plate are substantially constant in width throughout a substantial portion of their length and have a length to width ratio of at least four to one, said teeth are struck to form a plurality of spaced longitudinal rows having no fewer than two teeth per row, said teeth in each row are struck in the opposite direction from the teeth in the next adjacent row so that said slots formed thereby in each row extend from their respective said teeth in a direction opposite to the direction said slots in the next adjacent row extend from their respective said teeth.

5. A system according to claim 1, 2, 3 or 4 where the elongated member is longer than the width of the support member through which the elongated member passes, further comprising a second plate secured to the opposite side of the support member from the other said plate and said second plate having an opening therein through which the elongated member passes.

6. An assembly for mounting a roller rotatably mounted on an elongated member, said assembly comprising a support member having a bore hole therein for receiving the elongated member; a planar metal plate having an opening and a first plurality of slender elongated nail-like teeth struck therefrom to project outwardly from a side face of said plate and leaving a second plurality of corresponding slots in said plate such that at least one of said teeth extends from each of said slots, said plate being secured to said support member with said teeth thereof being embedded in one side of said support member and with said opening in said plate being aligned with said bore hole in said support member; and a resilient member having a central opening therein with inner dimensions less than the smallest dimension of said opening in said plate, said resilient member being adapted to be positioned between said plate and said support member with the central axis of said resilient member being in alignment with said opening in said plate and the longitudinal axis of said bore hole, whereby when the elongated member is attached to said support member, the elongated member passes through said opening in said plate and said resilient member and is gripped by both the edges of said plate surrounding said opening in said plate and the edges of said resilient member surrounding said central opening.

7. An assembly according to claim 6 wheren said resilient member is in the form of a ring and said bore hole within said support member is cylindrical and said opening within said plate is circular so as to securely receive a generally cylindrical elongated member.

8. A system according to claim 7 wherein the diameter of said opening in said plate and the inner diameter of said resilient member are at most approximately equal to the diameter of the elongated member that is to be mounted within said support member.

9. An assembly according to claim 8 wherein said teeth that are struck from said plate are substantially constant in width throughout a substantial portion of their length to width ratio of at least four to one, said teeth are struck to form a plurality of spaced longitudinal rows having no fewer than two teeth per row, said teeth in each row are struck in the opposite direction from the teeth in the next adjacent row so that said slots formed thereby in each row extend from their respective said teeth in a direction opposite to the direction said slots in the next adjacent row extend from their respective said teeth.

10. An assembly according to claim 8 wherein said support member has a further bore hole therein surrounding said bore hole and being concentric therewith, said further bore hole has a lesser depth than said bore hole and said resilient member is positioned within said further bore hole.

11. An assembly according to claim 10 wherein the inner diameter of said resilient member is less than the diameter of the elongated member.

12. A caster assembly comprising: a caster mounted on a generally cylindrical shaft; a support member having a bore therein, said shaft being arranged in said bore hole; a planar metal plate having a circular opening and a first plurality of slender elongated nail-like teeth struck therefrom to project outwardly from a side face of said plate and leaving a second plurality of corresponding slots in said plate such that at least one of said teeth extends from each of said slots, said plate being secured to said support member with said teeth thereof being embedded in one side of said support member and with said opening of said plate being aligned with said bore hole in said support member; and a resilient ring having an inner diameter less than the smallest dimension of said opening in said plate, said resilient ring being positioned between said plate and said support member with the central axis of said ring being in alignment with the central axes of said opening in said plate and said bore hole, so that said shaft passes through said opening in said plate and said resilient ring and is gripped by both the edges of said plate surrounding said opening and the inner edges of said resilient ring.

13. A caster assembly according to claim 12 wherein the diameter of said opening in said plate and the diameter of said ring are at most approximately equal to the diameter of said shaft.

14. An assembly according to claim 13 wherein said support member has a further bore hole therein surrounding said bore hole and being concentric therewith, said further bore hole has a lesser depth than said bore hole and said resilient member is positioned within said further bore hole.

15. An assembly according to claim 14 wherein the inner diameter of said resilient member is less than the diameter of the elongated member.

16. An assembly according to claim 15 wherein said teeth that are struck from said plate are substantially constant in width throughout a substantial portion of their length and have a length to width ratio of at least four to one, said teeth are struck to form a plurality of spaced longitudinal rows having no fewer than two teeth per row, said teeth in each row are struck in the opposite direction from the teeth in the next adjacent row so that said slots formed thereby in each row extend from their respective said teeth in a direction opposite to the direction said slots in the next adjacent row extend from their respective said teeth.

* * * * *

UNITED STATES PATENT AND TRADEMARK OFFICE
CERTIFICATE OF CORRECTION

PATENT NO. : 4,224,714

DATED : September 30, 1980

INVENTOR(S) : Andrew G. Seipos

It is certified that error appears in the above–identified patent and that said Letters Patent are hereby corrected as shown below:

Claim 12, column 9, line 12, after "bore" insert

--hole--.

Signed and Sealed this

Seventh Day of April 1981

[SEAL]

Attest:

RENE D. TEGTMEYER

Attesting Officer

Acting Commissioner of Patents and Trademarks